(No Model.)   2 Sheets—Sheet 1.
H. THOMSON.
APPARATUS FOR FLUSHING WATER CLOSETS.
No. 552,015.   Patented Dec. 24, 1895.
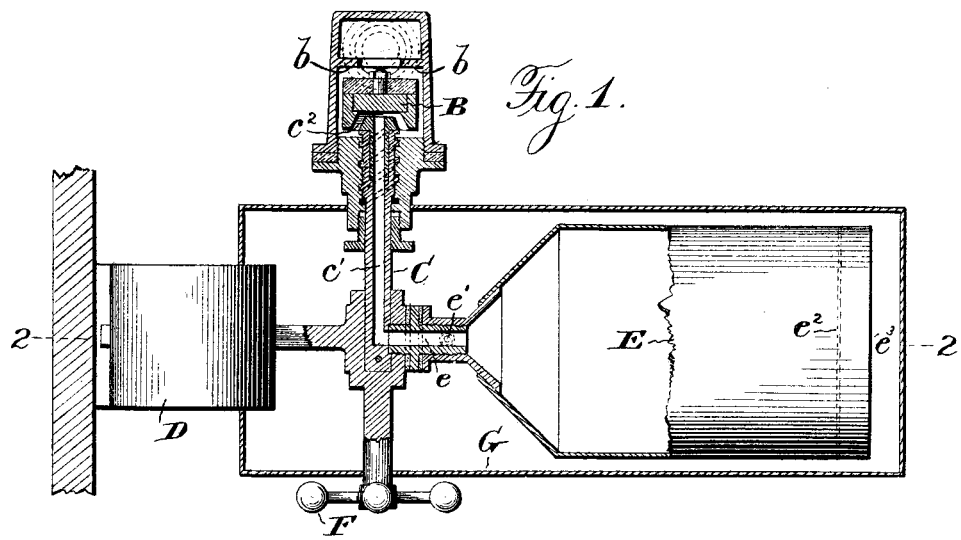
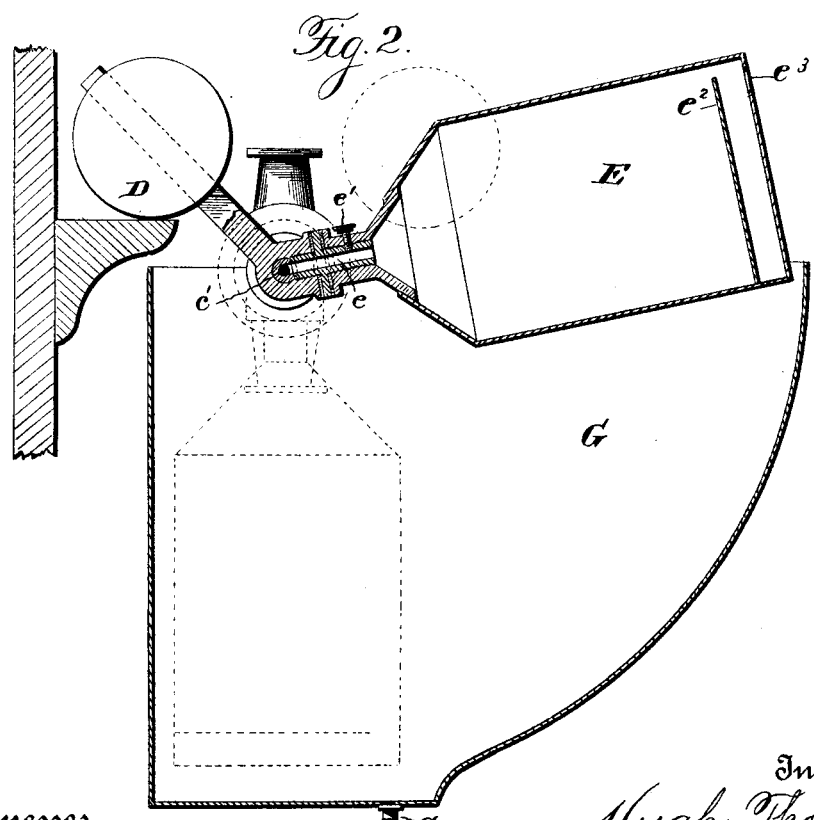
Witnesses
Jas E Hutchinson
J. G. Meyers Jr.
Inventor
Hugh Thomson
By James L. Norris
Attorney (No Model.) 2 Sheets—Sheet 2.
H. THOMSON.
APPARATUS FOR FLUSHING WATER CLOSETS.
No. 552,015. Patented Dec. 24, 1895.
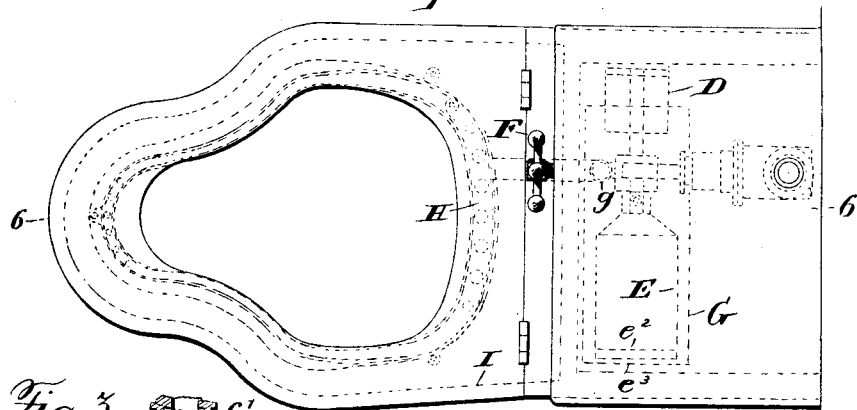
Fig. 5.
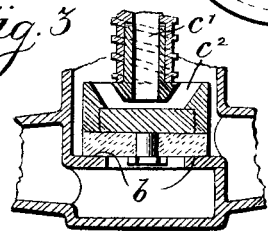
Fig. 3.
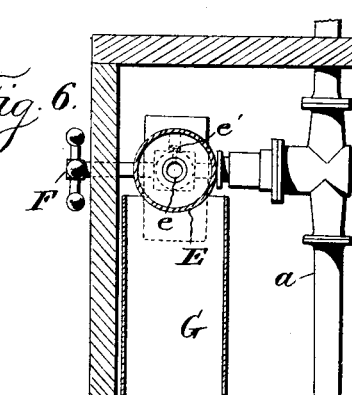
Fig. 6.
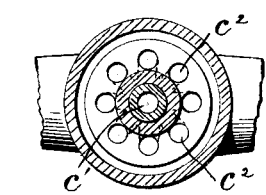
Fig. 4.
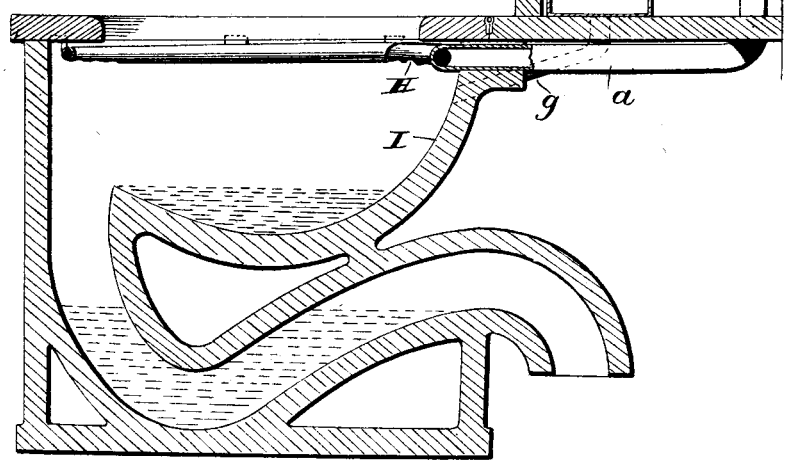
Witnesses
Jas. E. Hutchinson,
J. G. Meyers Jr.
Inventor
Hugh Thomson,
By James L. Norris.
Attorney

UNITED STATES PATENT OFFICE.

HUGH THOMSON, OF KEW, VICTORIA.

APPARATUS FOR FLUSHING WATER-CLOSETS.

SPECIFICATION forming part of Letters Patent No. 552,015, dated December 24, 1895.

Application filed July 1, 1895. Serial No. 554,647. (No model.)

*To all whom it may concern:*

Be it known that I, HUGH THOMSON, tanner, a subject of the Queen of Great Britain, residing at Thornton, Studley Park Road, Kew, near Melbourne, in the British Colony of Victoria, have invented new and useful Improvements in Apparatus for Flushing Water-Closets, of which the following is a specification.

This invention of improvements in apparatus for flushing water-closets has been devised in order to enable high-pressure water to be delivered direct into the pans of water-closets so as to utilize its full force and at the same time to make provision for automatically shutting off the high-pressure water after a sufficient quantity has been supplied, and also for supplying a small quantity of water to the pan of the closet by way of an after-flush in order to insure a sufficient quantity of water always remaining in the pan.

According to my invention, I provide a two-way screw tap or valve in a pipe leading from the high-pressure water-supply main to the pan of the closet, and I provide the spindle of said tap with a small hand-wheel or other contrivance whereby said tap can be rotated, as well as with a counterbalance-weight whose tendency is to keep said tap in any position (that is, either open or closed) in which it may be turned. This spindle is also fitted with a hollow cylinder or vessel on the opposite side to said counterbalance-weight, and the spindle is made hollow or provided with a passage leading from the interior of the casing of the tap or valve (above the valve-seating) into said hollow cylinder or vessel, so that when the flushing valve or tap is turned on the larger portion of the water will be discharged into the pan, while a smaller portion will pass into the hollow cylinder or vessel and will, after a certain lapse of time, overcome the resistance of the counterbalance-weight and again close the valve, thus shutting off the supply of pressure-water to the closet-pan, after which said cylinder will discharge its contents into the pan as an after-flush, so as to insure a certain amount of water remaining therein for the next user of the closet.

Referring to the accompanying drawings, Figure 1 is a horizontal section of an apparatus for flushing water-closets, showing same constructed according to this invention. Fig. 2 is a vertical central section thereof on line 2 2, Fig. 1. Fig. 3 is a central vertical section, drawn to a larger scale, of the valve or tap above referred to, while Fig. 4 is a plan of said valve. Fig. 5 is a plan of a water-closet fitted with flushing apparatus constructed according to this invention, and Fig. 6 is a vertical central section thereof.

The same letters of reference indicate the same parts in all the figures.

A represents the casing of the two-way valve or tap above referred to, and B the piston or valve thereof, whose spindle C is tubular or formed with a passage $c'$, as shown, and which has other passages or ports $c^2$ leading from the casing A into said spindle C.

D represents the comparatively heavy counterbalance-weight which is secured upon the spindle C, and serves, as indicated by dotted and full lines in Fig. 2, to keep the valve B either open or closed, as required, while E represents the hollow cylinder or vessel, which projects from the opposite side of the spindle C to the weight D, and is sufficiently heavy (when full of water) to overbalance the weight D and again close the valve by screwing it down onto its seating. This hollow cylinder E is in open communication with the hollow spindle C through a passage $e$, the open area of which can be varied as required by means of a set-screw $e'$, which can be turned so as to project more or less into said passage, according to the time required to elapse before the cylinder is sufficiently full to cause it to turn off the tap, and thus stop the supply to the closet, as above described.

F represents a small hand-wheel, handle, or other contrivance fitted upon the spindle C or elsewhere, to enable the valve B to be opened and the water to be turned on when required, while G represents a small cistern, which is mounted in any convenient position adjacent to the closet—as, for instance, on the seat—as shown, and which serves to contain the cylinder E and counterbalance-weight D. It has a small pipe $g$ leading to the perforated flushing ring or tube H, around the upper end of the closet-pan I, in order that the water in said cistern may be fed into the closet as an after-flush, the main high-pressure supply being led into the closet-pan from the valve or tap A B through the pipe $a$ leading to the ring or tube H.

The cylinder or vessel E is of that capacity which will operate to close the valve and cut off the supply of water when it has become substantially filled. In the event that the valve B should stick or should not respond to the weight of the filled cylinder or vessel I have provided a means for increasing the weight and leverage, which consists of a diaphragm $e^2$, fitted near the end of the cylinder farthest from the valve-spindle and extending to a point a little below the plane of the discharge-opening $e^3$, so that some of the water in the cylinder will pass over the partition and into the end compartment thereof and thus increase its operative weight and leverage sufficiently to operate the valve.

The flushing ring or tube H may be of metal or other suitable material and may have a ring of rubber or other packing inserted between it and the pan of the closet.

The operation of my invention is as follows: Ordinarily the valve B is held down on its seating $b$ by the weight D tending to rotate the spindle C in the required direction, said weight being in the position indicated by dotted lines in Fig. 2, with the cylinder E hanging downward and empty. When it is desired to flush the closet, the spindle C is turned back by hand with the aid of the hand-wheel F until the valve B is off its seat and the weight D and cylinder E are in the positions indicated by full lines in said Fig. 2. Water can then flow from the high-pressure main through the pipe $a$ to the closet-pan I, while a certain portion of such water will flow through the hollow spindle C into the cylinder E until there is sufficient weight of water in said cylinder to overcome the weight D and turn the spindle C of the valve back, so as to force said valve down onto its seat and thus shut off the supply again. The time during which the high-pressure water will be supplied to the closet is determinable by altering the area of the passage leading to the cylinder E, either by means of the set-screw $e'$ or otherwise. When the cylinder E is in its lowest position, the water contained in it will be free to flow out through a discharge-opening $e^3$ into the cistern G and thence through the small pipe $g$ into the pan I, which will be supplied with an after-flush of water, which will remain in it ready for the next time the closet is used.

Having now particularly described and ascertained the nature of my said invention and in what manner the same is to be performed, I declare that what I claim is—

1. A flushing apparatus for a water-closet, combining in its structure a valve having two conduits or pipe connections, one of which is adapted to connect with a closet-pan, a counterbalancing-weight which serves to hold the valve open, an after-flushing vessel connected with said counter-weight and communicating with and receiving liquid from the other one of said conduits or pipe connections while liquid from the valve is flowing to the closet-pan, and means for conducting liquid from said vessel to the closet-pan for after flushing when the quantity of liquid accumulating in the vessel overbalances the weight and closes the valve, substantially as described.

2. In apparatus for flushing water-closets, the combination with a valve and a vessel secured upon the spindle thereof, said valve supplying high pressure water to the closet pan and also to the vessel by means of a passage communicating with said vessel through the valve-spindle, substantially as described.

3. In an apparatus for flushing a water-closet, the combination of a valve having two conduits or pipe connections, one of which is adapted to connect with a closet-pan, a pivoted, swinging, counterbalance-weight which serves to hold the valve open, a swinging after-flushing vessel connected with the weight and communicating with and receiving liquid from the other one of said conduits or pipe connections while liquid from the valve is flowing to the closet-pan, and means for conducting liquid from said vessel to the closet-pan for after flushing when the quantity of liquid accumulating in the vessel overbalances the weight and closes the valve, substantially as described.

4. In an apparatus for flushing a water-closet, the combination with a valve having two conduits or pipe connections, one of which is adapted to connect with a closet-pan, of a pivoted, swinging, counterbalance-weight which serves to close the valve, a swinging after-flushing vessel connected with said weight, and communicating with and receiving a certain portion of liquid from the other one of said conduits or pipe connections, while liquid from the valve is flowing to the closet-pan, and a cistern adapted to communicate with the closet-pan and in which said after-flushing vessel is arranged to discharge thereinto when the weight of liquid in the vessel overbalances the weight and closes the valve, substantially as described.

5. In an apparatus for flushing water-closets, the combination with a flushing valve, of a hollow cylinder or vessel arranged in operative connection with the said valve and operating to close the same after a certain time, said cylinder or vessel having a diaphragm or partition $e^2$ extending across the same near one end, substantially as and for the purposes described.

HUGH THOMSON.

Witnesses:
EDWARD WATERS,
EDWARD WATERS, Jr.